No. 888,223. PATENTED MAY 19, 1908.
G. W. CHATMOND.
TROLLEY POLE.
APPLICATION FILED NOV. 7, 1907.
2 SHEETS—SHEET 1.
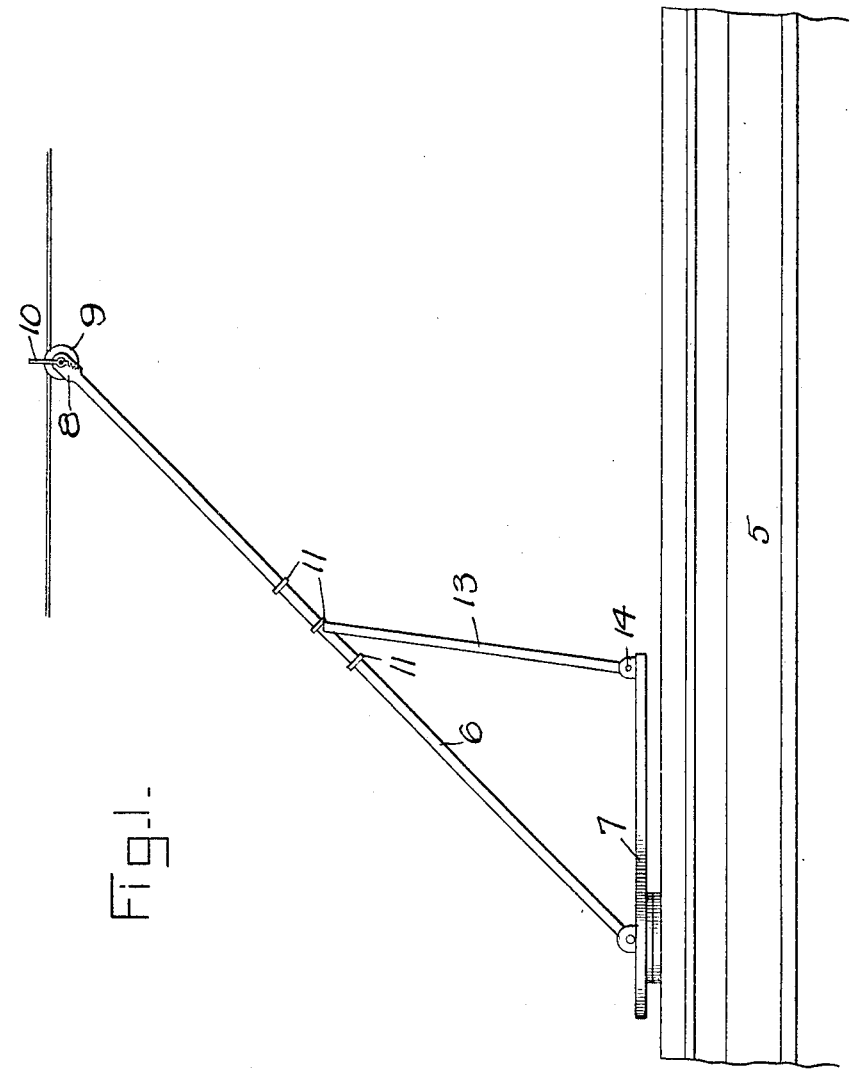
Witnesses
Inventor
George W. Chatmond,
By
Attorneys No. 888,223. PATENTED MAY 19, 1908.
G. W. CHATMOND.
TROLLEY POLE.
APPLICATION FILED NOV. 7, 1907.
2 SHEETS—SHEET 2.
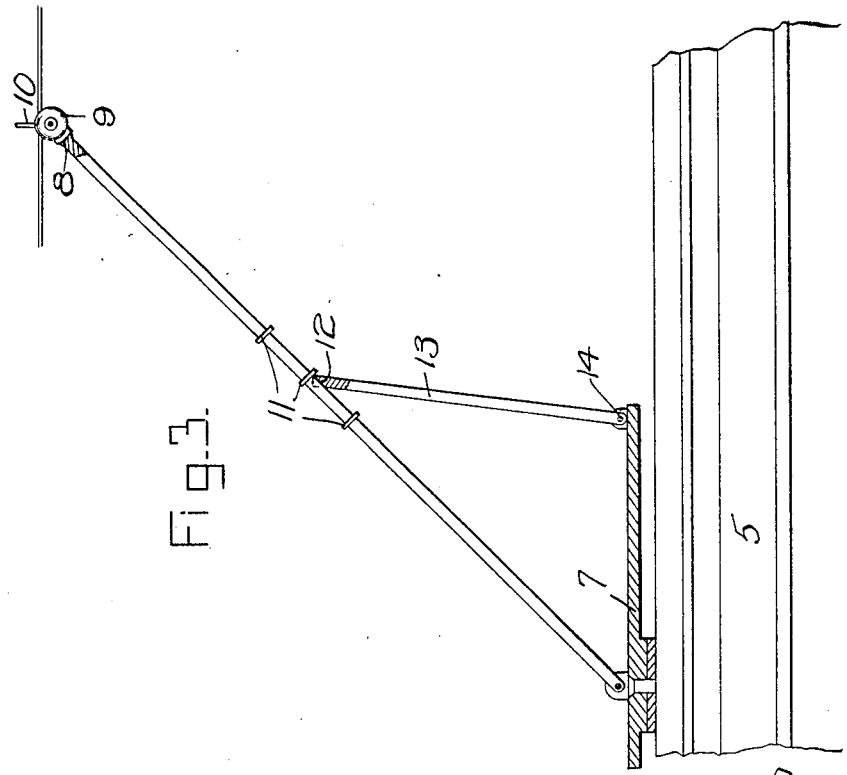
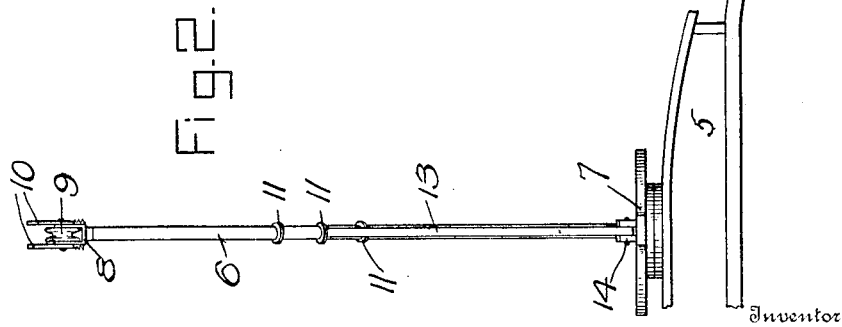

UNITED STATES PATENT OFFICE.

GEORGE W. CHATMOND, OF LOUISVILLE, KENTUCKY.

TROLLEY-POLE.

No. 888,223.  Specification of Letters Patent.  Patented May 19, 1908.

Application filed November 7, 1907. Serial No. 401,178.

*To all whom it may concern:*

Be it known that I, GEORGE W. CHATMOND, a citizen of United States, residing at Louisville, in the county of Jefferson, State of Kentucky, have invented certain new and useful Improvements in Trolley-Poles; and I do hereby declare the following to be a full, clear, and exact description of the invention, such as will enable others skilled in the art to which it appertains to make and use the same.

This invention relates to new and useful improvements in trolley poles and more particularly to a trolley pole constructed to coact with a supporting element, the latter partaking of the nature of a trolley guard to hold the pole from vibration and consequent slipping from the wire.

The invention aims as a primary object to provide a novel construction, combination and arrangement of parts the details of which will appear in the course of the following description, in which reference is had to the accompanying drawings forming a part of this specification, like characters of reference designating similar parts throughout the several views, wherein:—

Figure 1 is a side elevation of a trolley pole and its adjunctive elements constructed in accordance with the present invention. Fig. 2 is a rear end elevation thereof. Fig. 3 is a detailed longitudinal sectional view thereof.

In the accompanying drawings, the numeral 5 designates the car, having the trolley pole 6 pivotally mounted on a rotatable supporting base 7 and formed at its upper end with a fork 8 which supports the trolley wheel 9. At each side of the wheel 9 spring held pivoted guide fingers 10, are provided which extend upwardly to prevent the wheel from jumping laterally from the wire, the fingers 10 being designed to yield when they contact with the transverse supporting wires. The pole 6 is formed along its body portion on the under side thereof, with a plurality of spaced annular flanges 11, which serve as stops for the concavely rounded upper end 12 of a supporting pole 13, which is disposed rearwardly of the pole 6 and which has its lower end pivoted as at 14 to the base 7.

It will be apparent that the inclination of the pole 6 may be varied at option in accordance with the particular flange against which the pole 13 bears, the concaved upper end of the latter partially surrounding said pole.

What is claimed is:—

1. The combination with a pivoted trolley pole having spaced engaging means thereon, of a pivoted supporting member adjustably engaging said means to hold the trolley pole in selected adjusted positions.

2. The combination with a pivoted trolley pole, of a plurality of spaced annular flanges on said trolley pole, and a pivotal supporting element adjustably engaging said flanges to maintain the trolley pole in selected angularly adjusted positions.

In testimony whereof, I affix my signature, in presence of two witnesses.

GEORGE W. CHATMOND.

Witnesses:
J. H. JACKSON,
CHAS. H. LANG.